(12) United States Patent
Brillon

(10) Patent No.: US 7,318,391 B2
(45) Date of Patent: Jan. 15, 2008

(54) FOOD LIFTER

(76) Inventor: Daniel Brillon, 2529, Hochelaga, Montreal, Quebec (CA) H2K 1J4

( * ) Notice: Subject to any disclaimer, the term of this patent is extended or adjusted under 35 U.S.C. 154(b) by 227 days.

(21) Appl. No.: 11/159,855

(22) Filed: Jun. 23, 2005

(65) Prior Publication Data

US 2006/0288946 A1    Dec. 28, 2006

(51) Int. Cl.
*A01K 5/01* (2006.01)

(52) U.S. Cl. .................. 119/61.57; 119/51.5
(58) Field of Classification Search ............ 119/51.01, 119/51.5, 58, 60, 63, 61.5, 61.56, 61.57; 248/407, 408, 423, 295.11, 297.21, 297.31
See application file for complete search history.

(56) References Cited

U.S. PATENT DOCUMENTS

| 1,698,355 | A | | 1/1929 | Wiemer |
| 4,205,629 | A | | 6/1980 | Wix |
| 4,976,223 | A | | 12/1990 | Pierce |
| 5,000,124 | A | | 3/1991 | Bergen |
| 5,054,431 | A | * | 10/1991 | Coviello ................. 119/61.56 |
| 5,081,957 | A | | 1/1992 | Warner, Jr. |
| 5,501,176 | A | | 3/1996 | Tully |
| 5,584,263 | A | | 12/1996 | Sexton |
| 5,887,545 | A | | 3/1999 | Cuttress |
| 6,311,640 | B1 | | 11/2001 | Mercado |
| 6,681,719 | B1 | | 1/2004 | Warner |

* cited by examiner

*Primary Examiner*—T. Nguyen

(57) ABSTRACT

A lifter for pet food or water bowls. consists in a channel through which slides a riser lifting a hook onto which is hooked either a platform or a bowl or any such container. A handle allows the user to raise the hook to any desired height at which point it is automatically locked to that given height. By actuating a lever, the hook can be lowered.

2 Claims, 5 Drawing Sheets

FOOD LIFTER

Figure 1:
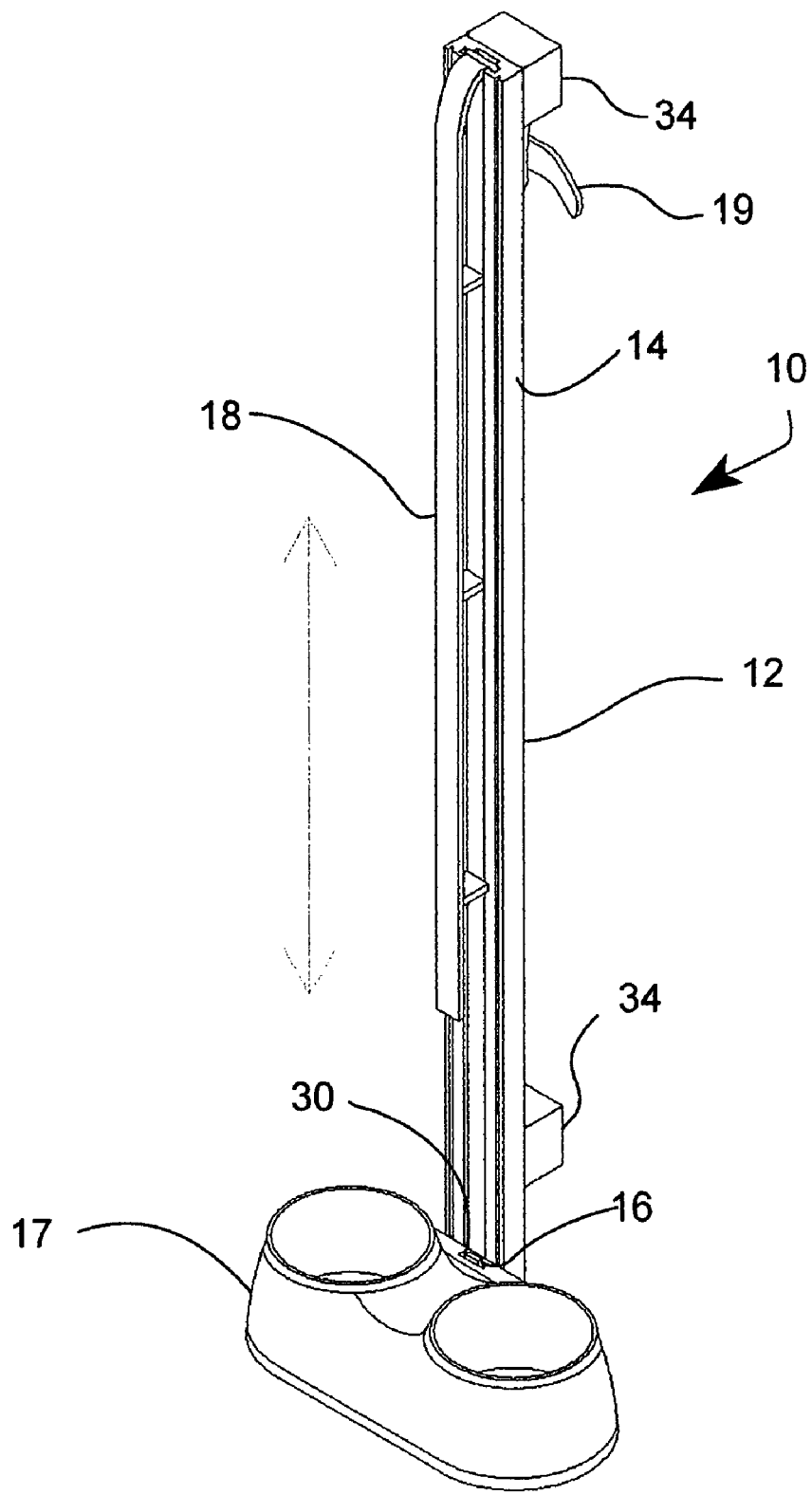

BACKGROUND OF THE INVENTION:

1. Field of the invention

The invention relates generally to household accessories but more particularly to a lifter for pet food or water bowls.

2. Background of the Invention

For practical as well as health reasons, devices aimed at raising and lowering the food or water bowls of pets have been developed. Indeed, some pet owners have various conditions that do not allow them to bend easily so any device aimed at avoiding that is welcome.

There are of course several inventions aimed at performing that specific function but there is always a need for a simple and practical way of achieving that.

SUMMARY OF THE INVENTION

The invention consists in a channel through which slides a riser lifting a hook onto which is hooked either a platform or a bowl or any such container. A handle allows the user to raise the hook to any desired height at which point it is automatically locked to that given height. By actuating a lever, the hook can be lowered.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE PREFERRED EMBODIMENT

FIG. 1 Perspective view of the food lifter in the down position.

Figure 2:
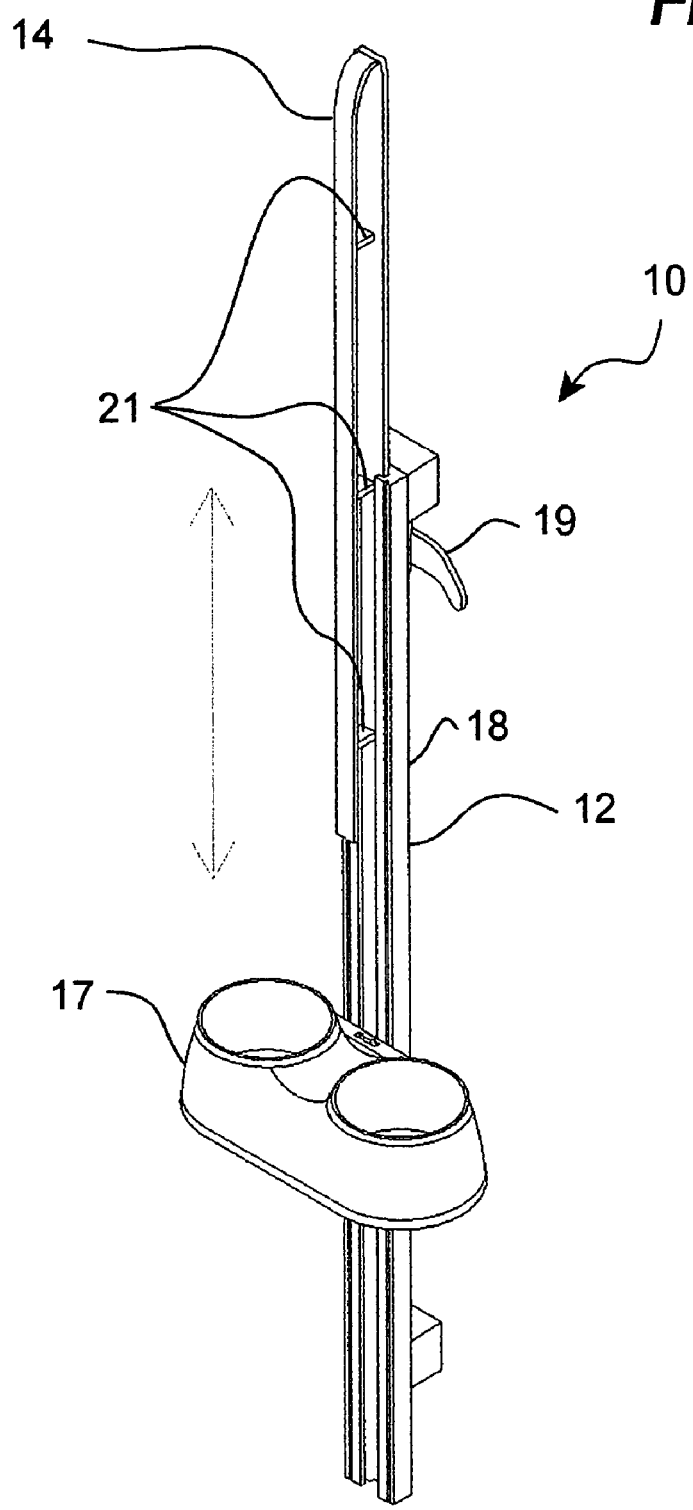

FIG. 2 Perspective view of the food lifter in a semi raised position.

Figure 3:
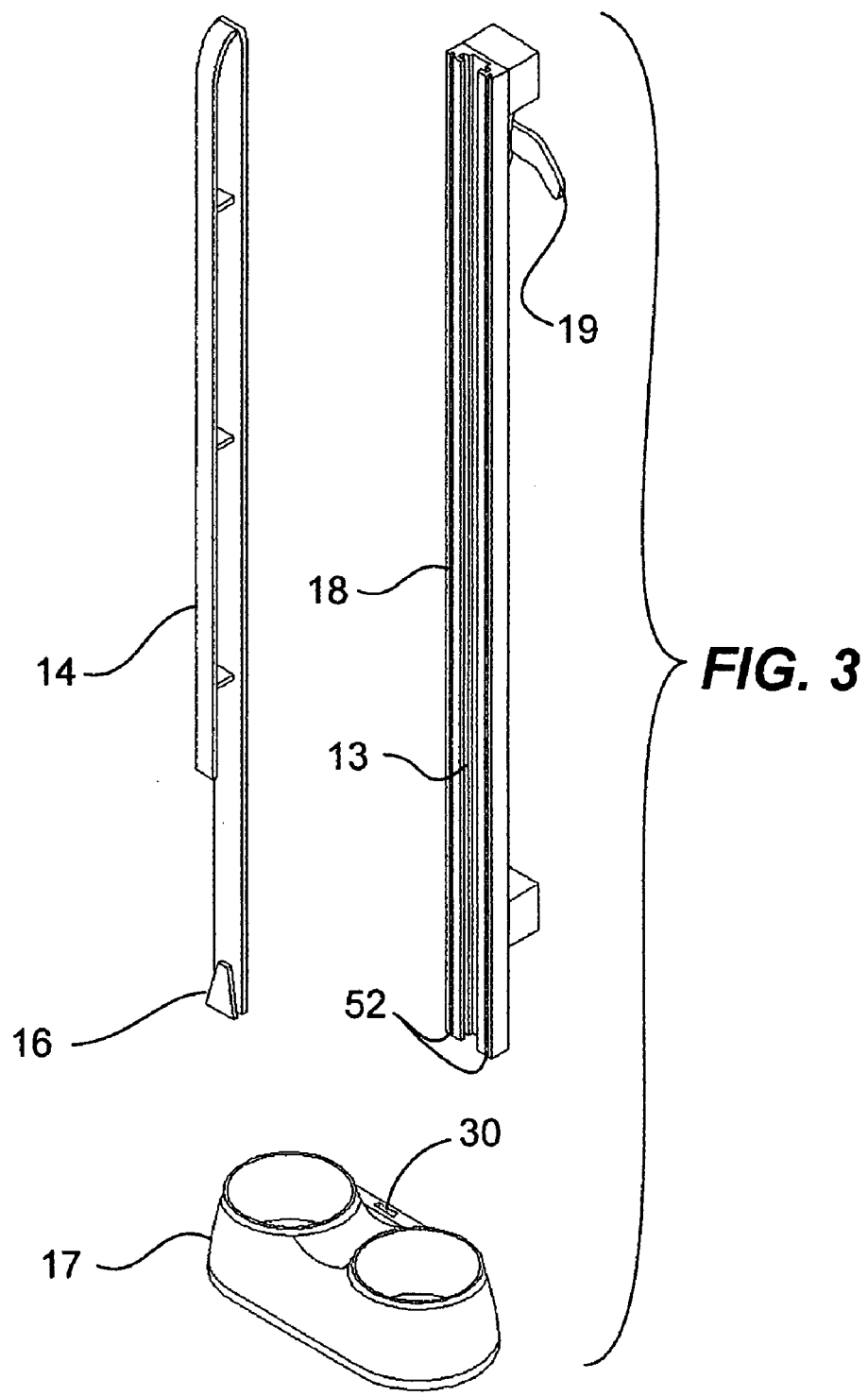

FIG. 3 Exploded perspective view of the food lifter.

Figure 4:
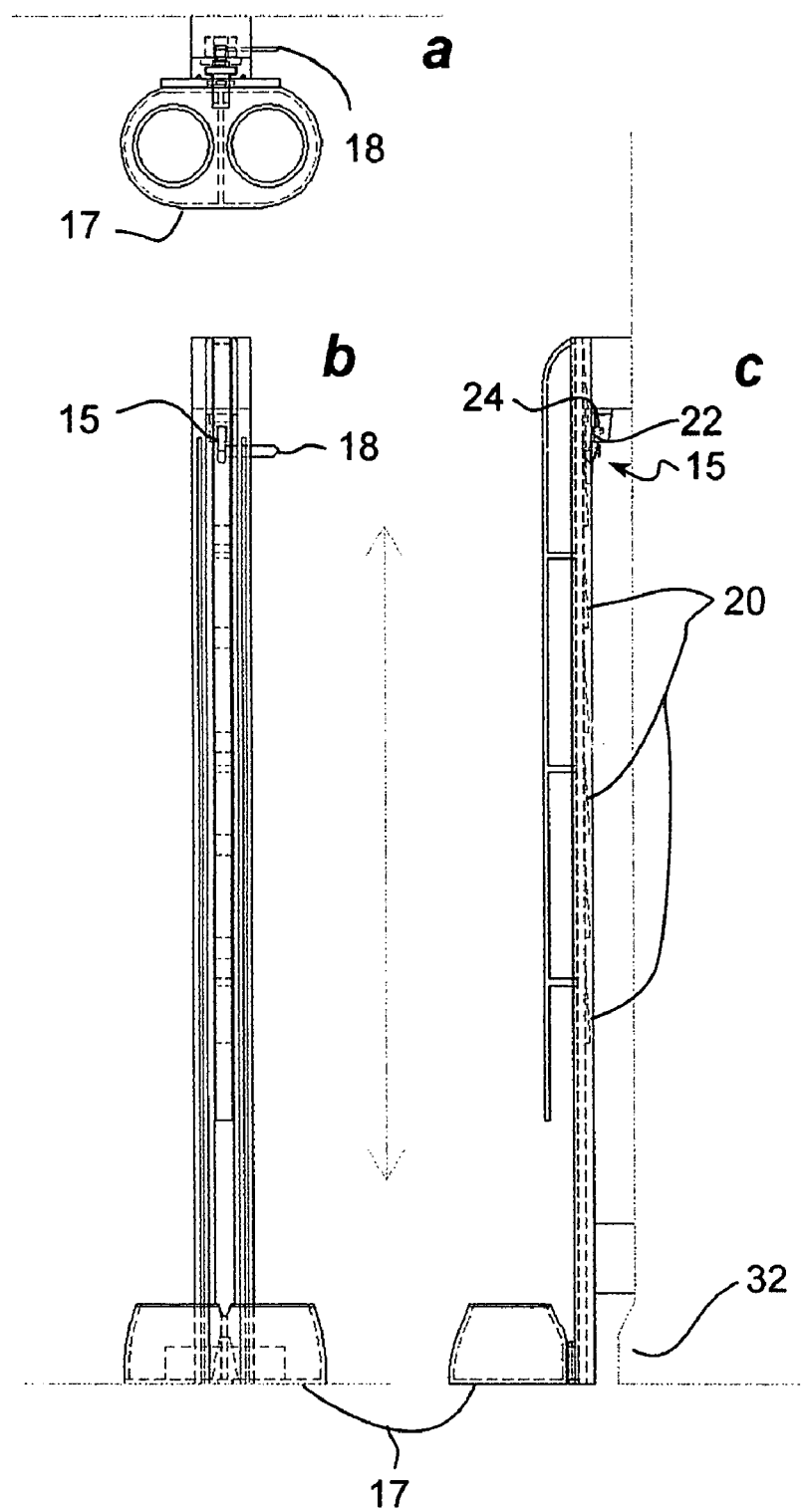

FIGS. 4abc Top front and side views respectively of the food lifter.

Figure 5:
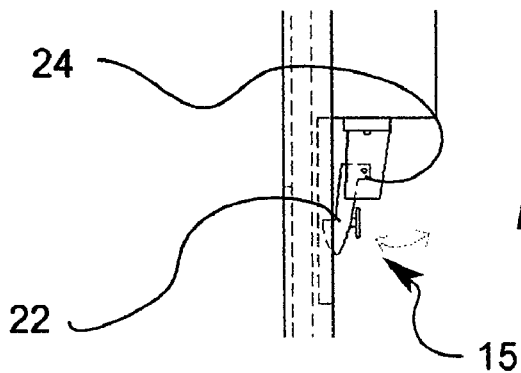

FIG. 5 Side view of the ratchet means.

Figure 6:
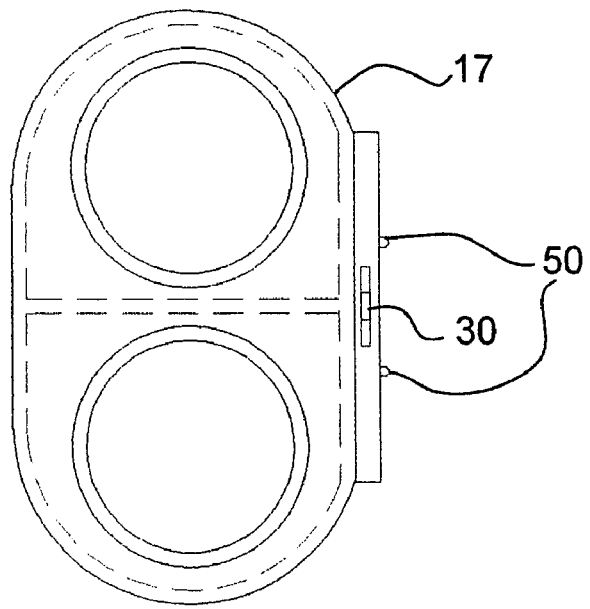

FIG. 6 Top view of the bowl assembly.

Figure 7:
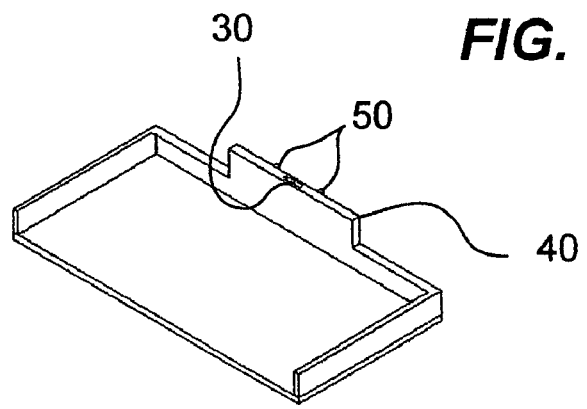

FIG. 7 Perspective view of the platform.

DETAILED DESCRIPTION OF THE PREFERRED EMBODIMENT

A food lifter (10) has a channel frame (12) having a main channel (13) configured and sized for receiving a riser (14) slidingly engaging the main channel (13). The riser (14) has a hook (16) at its lower end extending therefrom and used for hooking a bowl assembly (17) or a shelf or platform (40) as per FIG. 7 for supporting a generic bowl (not shown) or any other suitable object. The riser (14) has a handle (18) along most of the length of the riser (14) with several points of attachment (21) to the riser (14) which allows the user to raise or lower the riser (14) from a wide range of location so that no matter the position of the handle (18) or the height of the user, the handle (18) is always within reach. According to the height or preference of the user, once the bowl assembly (17) has reached a certain height, a ratchet means (15) situated atop the channel frame (12) actuated by a lever (19) stops the riser (14) from moving downward by using a set of teeth (20) positioned along the length of the riser (14) on the side opposite that of the handle (18) with all teeth (20) extending from the riser (14). The teeth (20) interact with a pawl (22) and its biasing means (24) so that the pawl (22) is always biased against the teeth (20) except when the user pulls on it with the lever (19) such as when lowering of the riser (14). Once the platform (16) is raised and set at a preferred height, the user can interact with it. The teeth (20) and pawl representing the main component of the ratchet means (15), one understands what orientation the teeth (20) should have if an upward pull allows for free sliding of the riser (14) within the channel frame (12) while a pull on the pawl (22) is required for lowering the riser (14). The channel frame (12) has a pair of side channels (52) running parallel to the main channel (13) and into which slide guides (50) found on the bowl assembly (17) or the platform (40).

The bowl assembly (17) is a custom made twin bowl unit having an opening (30) through which engages the hook (16) which will raise the bowl assembly (17) as the riser (14) is risen. The configuration of the bowl assembly (17) can of course differ from that illustrated but a twin bowl is preferred as it can hold water in one bowl and food in the other. As discussed earlier, a platform (40) can replace the bowl assembly (17) as long as it has an opening (30) that fits the hook (16). To allow some room for the ratchet means (15) as well as clearing baseboards (32) spacer blocks (34) set a distance between a surface (36) such as a wall and the channel frame (12).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A food lifter comprising:
a channel frame having a main channel through which slides a riser;
said riser having a hook situated at the lower end of said riser and extending therefrom, a handle extended generally along the length of said riser with a plurality of attachment points to said riser to allow a user to raise or lower said riser, and a set of teeth extended therefrom and positioned along the length of said riser on the side opposite to that of said handle; a ratchet means situated atop said channel frame wherein said ratchet means having a pawl with a biasing means, and said set of teeth interacts with said pawl and said biasing means for stopping said riser from moving downwardly; and a platform or a bowl assembly hooks onto said hook.

2. A food lifter as in claim 1 wherein:
said handle fixedly attached to said riser at a plurality of attachment points.

* * * * *